United States Patent
Yu et al.

(10) Patent No.: US 6,956,328 B1
(45) Date of Patent: Oct. 18, 2005

(54) TUNGSTEN HALOGEN LAMP WITH HALOGEN-CONTAINING COMPOUND AND SILICON-CONTAINING COMPOUND

(75) Inventors: Thomas H. Yu, Highland Heights, OH (US); Shailesh R. Sheth, Westlake, OH (US); Gino Savarino, Cleveland Heights, OH (US); Bart P. Terburg, Mayfield Village, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/666,750

(22) Filed: Sep. 18, 2003

Related U.S. Application Data

(63) Continuation of application No. 09/718,729, filed on Nov. 22, 2000, now abandoned.

(51) Int. Cl.[7] .......................... H01J 17/20; H01J 61/12
(52) U.S. Cl. ...................... 313/637; 313/579; 313/548; 313/557
(58) Field of Search ................................ 313/578, 579, 313/545, 548, 561, 643, 551, 557, 546, 547, 313/637, 562; 445/9, 16, 55

(56) References Cited

U.S. PATENT DOCUMENTS

| | | | |
|---|---|---|---|
| 1,944,825 A | * | 1/1934 | Millner ........................ 313/567 |
| 4,898,558 A | | 2/1990 | Shaffer |
| 4,923,424 A | * | 5/1990 | Shaffer ......................... 445/55 |
| 5,034,656 A | | 7/1991 | Yu et al. |
| 5,109,182 A | | 4/1992 | Laszlo |

FOREIGN PATENT DOCUMENTS

EP      EU00328065 A2 * 8/1989 ............ H01K 1/56

* cited by examiner

*Primary Examiner*—Vip Patel
*Assistant Examiner*—Glenn Zimmerman
(74) *Attorney, Agent, or Firm*—Fay, Sharpe, Fagan, Minnich & McKee, LLP

(57) ABSTRACT

A tungsten halogen lamp (10) includes a light transmissive envelope (12), which encloses a tungsten filament (14) and a gaseous fill comprising an inert gas and a halogen-containing gas, such as an alkyl halide. In addition the fill includes a silicon-containing compound capable of gettering oxygen within the envelope. The atomic ratio of silicon to halogen in the envelope is selected so as to remove most, but not all of the oxygen present in the envelope A silicon: halogen ratio of less than about 0.5 more preferably, below about 0.4 has been found to be effective in this respect.

17 Claims, 3 Drawing Sheets

TUNGSTEN HALOGEN LAMP WITH HALOGEN-CONTAINING COMPOUND AND SILICON-CONTAINING COMPOUND This application claims the benefit as a continuation of U.S. application Ser. No. 09/718,729, filed Nov. 22, 2000, now abandoned.

BACKGROUND OF THE INVENTION

1. Field of the Invention

The present invention relates the lamp arts. It finds particular application in conjunction with improvement in the performance of tungsten halogen lamps by reducing oxygen and/or moisture content of the lamp.

2. Discussion of the Art

Tungsten halogen lamps, which comprise a hermetically sealed vitreous, light transmissive envelope enclosing a tungsten filament and containing a fill comprising a halide or halogen gas are widely used in a variety of applications. These lamps operate on a tungsten halogen cycle which is a regenerative, continuous process in which a halogen-containing tungsten compound is produced when the halide combines chemically with particles of tungsten evaporating from the incandescent tungsten filament. Subsequent thermal decomposition of these so-formed halogen-containing tungsten compounds at the filament returns the tungsten particles back to the filament. Halogen compounds used for the fill include bromine and bromides, such as hydrogen bromide, methyl bromide, dibromomethane, and bromoform. For lamps that operate at low temperatures, i.e. below about 200° C. interior wall temperatures, premature failure of the lamps may occur due to blackening of the glass envelope. The blackening is due to tungsten transferred from the filament to the wall. The presence of oxygen and/or water vapor in the lamp atmosphere has been found to contribute to the wall blackening. Water vapor is particularly harmful because even trace amounts increase the evaporation of the tungsten filament coil by means of the well-known "water cycle." In the water cycle, the temperature of the tungsten coil is thermally sufficient to decompose water vapor into hydrogen and oxygen. The resulting oxygen reacts with the tungsten from the coil to form volatile oxides, which migrate to cool parts of the lamp and condense. These oxide deposits are reduced by the gaseous hydrogen to yield black metallic tungsten and reformed water, which causes the cycle to repeat.

Excess oxygen in incandescent lamps is similarly a problem. For example in the tungsten halogen cycle, oxygen is the primary agent of attack on the tungsten filament. This attack may result in etching and oxide growth and usually causes early filament failure. However, small amounts of oxygen have been found to promote the tungsten cycle by reacting with the tungsten on the walls to form a compound of tungsten, oxygen, and halogen. This gaseous compound moves back to the filament and decomposes back to tungsten at the filament.

Methods of reducing excess oxygen in tungsten halogen lamps are well known. One commonly utilized solution is to introduce one or more compounds into the lamp which will remove excess oxygen and prevent its participation in the tungsten halogen cycle. Such compounds are commonly referred to as oxygen getters. Oxygen gettering systems which have been used previously include metallic getters such as tantalum, zirconium, niobium, copper, titanium, aluminum, and various combinations of these metals. The fabrication of specialized alloys can add considerably to the cost of manufacturing the lamp. Additionally, such getters tend to function only in discreet locations within the lamp.

Phosphorus compounds have also been used as oxygen getters, including phosphine gas, which is thermally decomposed into phosphorus and hydrogen in the energized lamp. Another gettering system comprises silane compounds, as disclosed in U.S. Pat. No. 4,898,558. Activation of these silane getters is achieved by baking the filled lamp at a temperature of about at least 350° C. for five minutes to react the silane with any oxygen in the lamp to form non-volatile silicon dioxide and hydrogen. Such lamps have been found to have reduced lifetimes, as compared with silane-free equivalents. Recently, tungsten halogen lamps have been used in automotive products, such as lights. To achieve a white light emission from the generally yellow tungsten halogen lamps, it has been found that the application of a blue coating can be used. However, because the coating absorbs or reflects a portion of the emitted light, the lumen loss may be up to 5–30%. To compensate for the lumen loss it is desired to produce a filament with increased lumens to compensate for the lumen loss from the blue absorption coating. Although higher wattages may used to compensate for the lumen loss, for certain products, such as automotive products the option of increasing wattage is not available. In addition, higher wattages generate more heat and hence increase the probability of bulb wall darkening due to the higher bulb wall temperature, with reduced efficiency of the tungsten-halogen transport cycle. For such lamps, it is desirable to provide lumen output comparable to conventional lamps, while maintaining efficiency over the lifetime of the lamp.

The present invention provides a new and improved lamp and method of preparation, which overcomes the above-referenced problems and others.

BRIEF SUMMARY OF THE INVENTION

In an exemplary embodiment of the present invention, a lamp is provided. The lamp includes a hermetically sealed, light transmissive envelope and a tungsten filament within the envelope. A mixture is disposed within the envelope. The mixture includes inert gas, a halogen-containing compound, and a silicon-containing compound capable of gettering oxygen. The atomic ratio of silicon to halogen is up to about 0.5.

In another exemplary embodiment of the present invention, a method of preparing a lamp is provided. The method includes hermetically sealing an envelope to enclose a fill comprising inert gas, a halogen-containing compound, and a silicon-containing compound. The ratio of silicon to halogen is from 0.1 to 0.5. The method further includes energizing a tungsten filament within the envelope.

In another exemplary embodiment of the present invention, a lamp is provided. The lamp includes a hermetically sealed, light transmissive envelope and a tungsten filament within the envelope. A mixture of inert gas, a halogen-containing compound, and a silicon-containing compound capable of gettering oxygen is within the envelope.

The silicon-containing compound is present in a sufficient amount to maintain a lumen per watt efficiency of at least 60% of that of an equivalent lamp formed without a silicon-containing compound.

One advantage of the present invention is that it provides increased lamp lifetimes.

Another advantage of the present invention is that good lumen maintenance is achieved.

Still further advantages of the present invention will become apparent to those of ordinary skill in the art upon reading and understanding the following detailed description of the preferred embodiments.

DETAILED DESCRIPTION OF THE INVENTION

Figure 1:
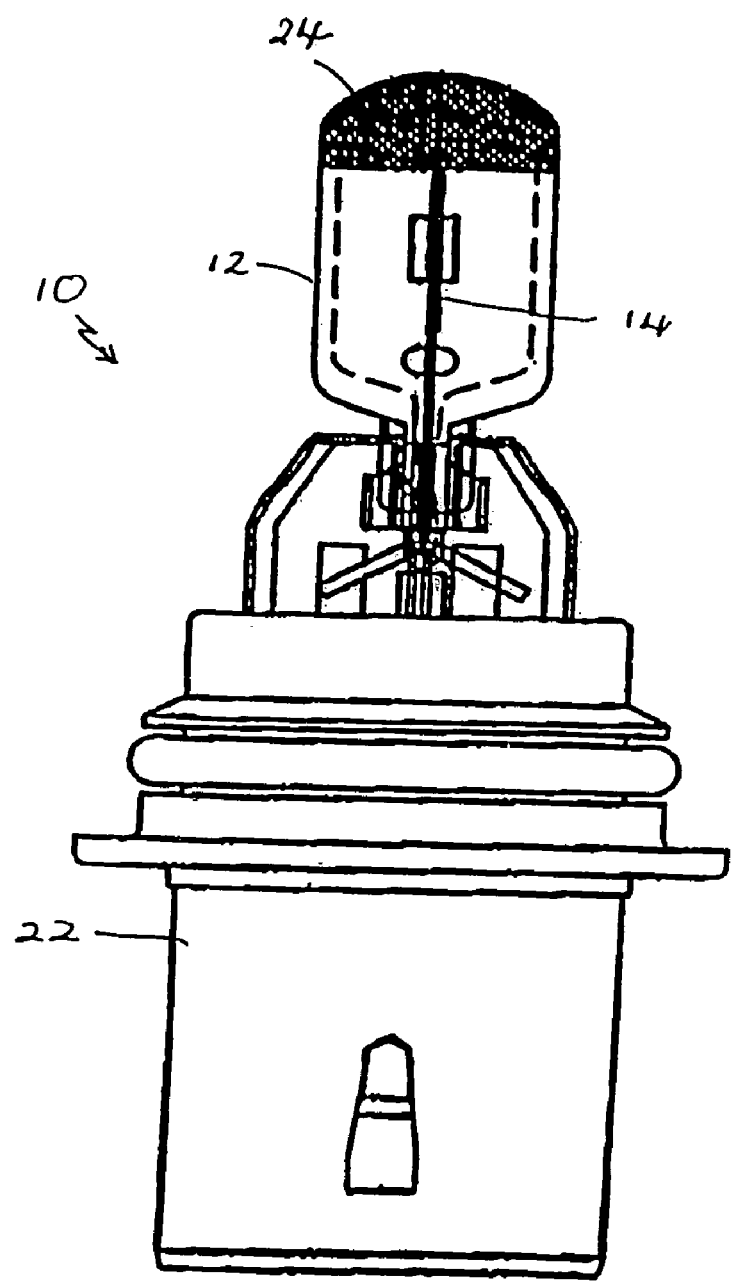
FIG. 1 is a side view of a tungsten halogen lamp according to the present invention.
Figure 2:
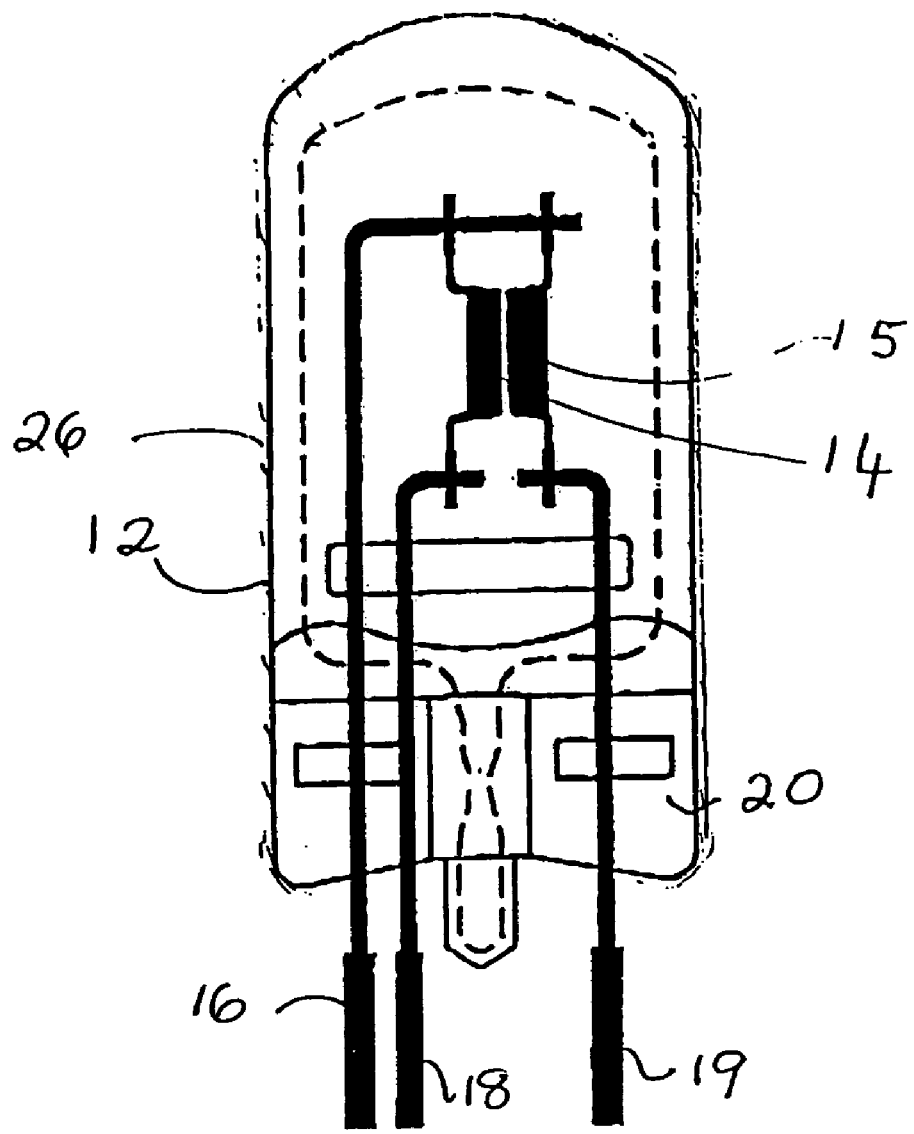
FIG. 2 is an enlarged perspective view of the lamp envelope and filaments of FIG. 1.

With reference to FIGS. 1 and 2, an exemplary single-ended tungsten halogen lamp 10 suited to use with the present invention is shown. Other tungsten halogen lamp types may also be used, including double-ended lamps. The lamp has a tubular, light transmissive envelope 12 formed from high temperature aluminosilicate glass, quartz, or other transparent material. A tungsten filament or coil 14 is supported within the envelope. For high brightness lamps, two (or more) filaments 14, 15 may be used, as shown in FIG. 2. The two filaments may be run at the same or at different wattages. Such dual-filament lamps are suited to use in high beam applications, such as for automobile high beam lamps, where the lamp lumen output and efficiency are more important than maintenance of lamp life. The filaments of FIG. 2 are arranged in parallel, although other arrangements are contemplated. The filament or filaments are supported by lead-in wires 16 and 18, formed from molybdenum (an additional lead-in wire 19 is preferably used in the case of dual filaments), and which extend through a customary pinch seal 20. The lead-in wires may extend from opposite ends of the envelope, as in a double-ended lamp, or from the same end of the envelope as in a single-ended lamp. If desired, the molybdenum lead-in wires may be connected by means of welding, brazing, or other suitable means to less costly metals of similar or greater diameter to provide electrical connection for the filament and also support for the lamp.

The lead-in wires are electrically connected to a source of power (not shown), via a base 22 of the lamp for energizing the lamp. The lamp may be further enclosed within an outer envelope or a parabolic reflector and a lens. For headlights, and other uses where it is desirable to modify the light output of the lamp, the lamp envelope may have an endcoat or black top 24, on a portion of at least one of its inner and outer surfaces, designed to reflect light back into the envelope. Additionally or alternatively, the lamp envelope may be coated on at least one of its inner and outer surfaces with a coating 26 of a filter material. The coating filters out a portion of the radiation from the filament from the light leaving the envelope to change the spectral distribution of the emitted light. In the case of a "blue" lamp, such as for a headlight, the filter filters a portion of the red and yellow light, giving the light a bluer appearance. Infrared filters and or UV filters may also be used.

The envelope 12 also contains a fill of a mixture of inert gas and a halogen-containing compound. The fill gas serves to retard evaporation of the coil. The lamp may be further enclosed within an outer envelope or surrounded by a parabolic reflector and a lens. Suitable halogen compounds include bromine compounds, such as bromine gas, hydrogen bromide, or hydrocarbon compounds, such as methyl bromide, dibromomethane, bromoform, and the like. Chlorine and fluorine equivalents of these compounds may also be used. The preferred source of halogen in the lamp is $CH_3Br$.

The inert gas is one or more of the more noble gases (including xenon, krypton, and argon, with xenon being most preferred). In high voltage (i.e., about 120 volts or more) lamps, a mixture of one or more noble gases with a gas which prevents arcing of the filament(s) may be used. Nitrogen has been found to be an effective gas for use in preventing filament arcing.

The fill additionally comprises a small amount of a silicon-containing compound. The silicon-containing compound acts as a getter, reducing the amount of oxygen in the envelope. However, the silicon compound is not present in so great a quantity as to remove the oxygen in the fill completely. The silicon-containing compound is present in a sufficient quantity to reduce the oxygen concentration to a level at which the tungsten halogen cycle is not substantially impaired, while reducing the deleterious effects of oxygen on wall blackening and filament failure. The water content of the fill is also reduced. To achieve these objectives, the silicon: halogen atomic ratio is preferably selected to be within the broad range of from about 0.1 to about 0.5.

Suitable silicon-containing compounds and halogen derivatives thereof have the general formula: $Si_aH_{[(2a+2)-b]}X_b$, where "a" is an integer greater than zero, "b" is an integer which has a value between zero and (2a+1), and X is Br, F, Cl, and/or I. Where no halogen is present, the compound has the general formula $Si_aH_{(2a+2)}$, where "a" is an integer greater than zero. Combinations of two or more silicon containing compounds may also be used. For the halogenated derivatives, bromine is a particularly preferred halogen. It should be noted that in the preferred halogenated derivates, at least one hydrogen is present.

Exemplary silicon compounds include silanes (hydrides of silicon) such as silane ($SiH_4$), disilane ($Si_2H_6$), trisilane ($Si_3H_8$), and tetrasilane ($Si_4H_{10}$), as well as various respective partially halogenated derivatives, such as $Si_2H_5Br$, and combinations thereof. The silanes tend to react with halogen compounds in the fill gas to form volatile halosilanes, which are also effective for gettering oxygen. $SiH_4$ is a particularly preferred getter.

The lamp may be formed in a variety of ways. In one method of manufacturing, the silicon-containing compound is mixed with the other components of the fill, particularly the inert gas and bromine (or other halogen) compound, and is introduced into the interior of the envelope. The lamp is then sealed. Unlike in prior methods, there is no need to activate the getter by heating, prior to operation of the lamp. Once the lamp is energized, the getter begins the work of binding oxygen in a stable, non-volatile form, typically as silicon dioxide.

It has been found that by carefully selecting the silicon to bromine (or other halogen) ratio in the envelope, the efficiency of the lamp can be maintained while maintaining the lifetime of the lamp. When the silicon concentration is too high, the efficiency of the lamp is reduced. This is thought to be because at high silicon concentrations, all or nearly all of the oxygen has been removed from the lamp and there is insufficient oxygen to promote the tungsten halogen cycle. Efficiency can be expressed in terms of:

lumens per watt at 50% of the expected lifetime of the lamp/lumens per waft of the fresh lamp The efficiency is lower if the envelope wall becomes coated with tungsten blackening. Thus, the silicon is in low enough quantity to allow a small amount of oxygen, or an oxygen compound capable of promoting the tungsten-halogen cycle, to remain in the envelope. If the fill contains significantly more oxygen than is typically found in the gases used for preparing the fill (for example, if oxygen is intentionally added to the fill) the ratio of silicon:halide may need to be increased slightly to compensate for the higher than normal oxygen levels.

Preferably, the silicon to bromine atomic ratio is in the range of from about 0.1 to about 0.5, more preferably, from about 0.1 to about 0.4, and most preferably, from about 0.3 to 0.4. In this range, the efficiency of the lamp can be maintained at about 60% or above. Above a ratio of about 0.5 the efficiency drops off. Around about 0.6, the efficiency is below 50%, which is generally considered to be unacceptable. The atomic ratio is the ratio of number of atoms, which in this case is the ratio of the number of silicon atoms to bromide or other halogen atoms.

In lamp uses where achieving a lamp lifetime increase is less important than maintaining the efficiency of the lamp, a ratio of from about 0.1 to about 0.3 may be preferred.

Without intending to limit the scope of the invention, the invention will be further understood by reference to the example below.

EXAMPLE

Dual filament, high brightness, single-ended tungsten halogen lamps (~12 volt) of the type illustrated in FIGS. 1 and 2 with a first filament 14 running at 55 watts and a second filament 15 running at 65 watts were prepared. The lamps included high temperature aluminosilicate glass envelopes and were prepared at various silicon to halogen atomic ratios from 0 to 0.5 by filling the lamp with a fill gas consisting of a mixture of $SiH_4$ and dibromethane in an inert gas (xenon), prior to sealing the lamp. Lamps were prepared with the following formulations, to a cold fill pressure of 7.5 atm.:

| Mole % CH2Br2 | Mole % SiH4 | Mole % N2 | Mole % Xenon |
|---|---|---|---|
| 0.05 | 0.0 | 2.5 | Balance |
| 0.05 | 0.03 | 2.5 | Balance |
| 0.04 | 0.03 | 2.5 | Balance |
| 0.04 | 0.04 | 2.5 | Balance |

The lumens per watt at time T=0, i.e., for fresh lamps, was determined. The lumens per watt at approximately 50% life (after about 76–100 hours, depending on the average lifetime) was determined for each of the lamps. Lamp life is defined as the time to burn-out. The percentage lumen per watt at approximate 50% life was then determined as the ratio of the two values:

% LPW ("efficiency")=LPW at 50% life/ % LPW when new.

Figure 3:
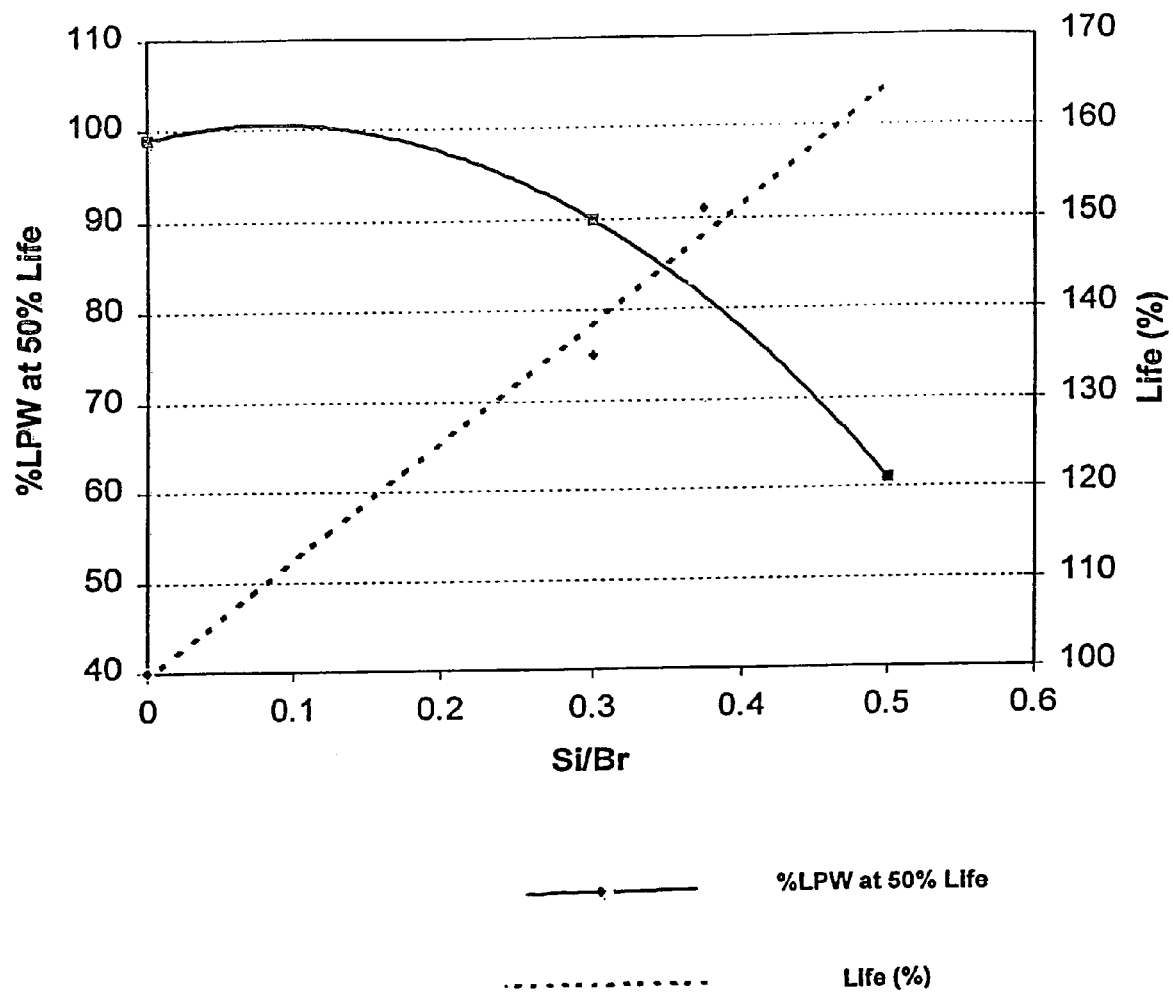
FIG. 3 shows plots of percent lumens per watt at 50% life vs silicon to bromine atomic ratio and average lamp life to failure, expressed as a percentage of a silane-free lamp, vs silicon to bromine atomic ratio.

A plot of percent lumen per watt efficiency versus silicon bromide atomic ratio is shown in FIG. 3 as an unbroken line. Each date point in the curve is an average of 5 lamp samples.

Average lifetime for each of the lamp types was determined and the lifetime expressed as a percentage of the life of an equivalent lamp with 0% silane. A plot of lifetime percent versus silicon to bromine atomic ratio is also shown in FIG. 3 (dotted line). Each data point in the curve is an average of 5 lamp samples.

As can be seen FIG. 3, the efficiency of the lamp is over 90% up to an Si:Br ratio of about 0.3. The efficiency then declines with increasing silicon to bromine ratio. The lifetime, however, increases with the silicon to bromine atomic ratio. At an Si:Br ratio of about 0.3, the lifetime is 150% of that of an equivalent lamp with no silicon getter. At higher Si:Br ratios, even greater lifetimes can be achieved. Selecting a preferred silicon to bromine ratio is thus a compromise between the loss in efficiency of the lamp and the benefits gained in increasing life. By selecting a silicon:bromine ratio of between about 0.1 and about 0.5, increases in the life can be achieved while retaining efficiencies of 60% and above. In the range of about 0.3 to 0.4, the lifetime is 140% or more of that of a silane-free lamp, while the efficiency is about 80% or above.

What is claimed is:

1. A lamp comprising:
    a hermetically sealed, light transmissive envelope;
    a tungsten filament within the envelope; and
    a mixture of inert gas, a halogen-containing compound, and a silicon-containing compound for gettering oxygen within the envelope, wherein the atomic ratio of silicon to halogen in the mixture is from 0.1 to about 0.5.

2. The lamp of claim 1 wherein the atomic ratio of silicon to halogen is less than about 0.4.

3. The lamp of claim 1, wherein the atomic ratio of silicon to halogen is from 0.3 to 0.4.

4. The lamp of claim 1, wherein the silicon-containing compound is of the general formula $Si_aH_{[(2a+2)-b]}X_b$, wherein a is an integer greater than zero, b is an integer which has a value between zero and (2a+1), and X is selected from the group consisting of Br, F, Cl, I, and combinations thereof.

5. The lamp of claim 4, wherein the silicon-containing compound includes a silane.

6. The lamp of claim 5, wherein the silane is selected from the group consisting of $SiH_4$, $Si_2H_6$, $Si_3H_8$, $Si_4H_{10}$, and combinations thereof.

7. The lamp of claim 4, wherein b is greater than zero and X is Br.

8. The lamp of claim 1, wherein the inert gas includes a noble gas selected from the group consisting of xenon, argon, krypton, and combinations thereof.

9. The lamp of claim 8, wherein the inert gas further includes nitrogen.

10. A lamp comprising:
    a hermetically sealed, light transmissive envelope;
    a tungsten filament within the envelope; and
    a mixture of inert gas, a halogen-containing compound, and a silicon-containing compound for gettering oxygen within the envelope, wherein the silicon-containing compound is present in a sufficient amount to maintain a lumen per watt efficiency of at least 60% of that of an equivalent lamp formed without a silicon-containing compound.

11. The lamp of claim 10, wherein the lumen per watt efficiency is at least 80%.

12. The lamp of claim 10, wherein a lifetime of the lamp is at least 120% of that of the equivalent lamp formed without a silicon-containing compound.

13. The lamp of claim 10, wherein the silicon-containing compound is of the general formula $Si_aH_{[(2a+2)-b]}X_b$, wherein a is an integer greater than zero, b is an integer which has a value between zero and (2a+1), and X is selected from the group consisting of Br, F, Cl, I, and combinations thereof.

14. The lamp of claim 13, wherein the silicon-containing compound includes a silane.

15. The lamp of claim 14, wherein the silane is selected from the group consisting of $SiH_4$, $Si_2H_6$, $Si_3H_8$, $Si_4H_{10}$, and combinations thereof.

16. The lamp of claim 1, wherein the atomic ratio of silicon to halogen is at least about 0.3.

17. A lamp comprising:

a light transmissive envelope;

at least one filament within the envelope, the at least one filament being formed from tungsten; and a fill gas sealed within the envelope and comprising an inert gas, a halogen-containing compound and a silicon-containing compound for gettering oxygen within the envelope, wherein the silicon-containing compound is present in a sufficient amount to maintain oxygen or an oxygen containing compound for promoting the tungsten halogen cycle in the envelope during operation of the lamp, and the atomic ratio of silicon to halogen in the fill gas is from 0.1 to about 0.5.

* * * * *